US007968231B2

(12) United States Patent
Amine et al.

(10) Patent No.: US 7,968,231 B2
(45) Date of Patent: Jun. 28, 2011

(54) ELECTRODE MATERIALS AND LITHIUM BATTERY SYSTEMS

(75) Inventors: Khalil Amine, Downers Grove, IL (US); Ilias Belharouak, Westmont, IL (US); Jun Liu, Naperville, IL (US)

(73) Assignee: U Chicago Argonne, LLC, Chicago, IL (US)

( * ) Notice: Subject to any disclaimer, the term of this patent is extended or adjusted under 35 U.S.C. 154(b) by 1170 days.

(21) Appl. No.: 11/444,219

(22) Filed: May 31, 2006

(65) Prior Publication Data

US 2007/0148545 A1 Jun. 28, 2007

Related U.S. Application Data

(60) Provisional application No. 60/753,575, filed on Dec. 23, 2005.

(51) Int. Cl.
*H01M 4/131* (2010.01)
*H01M 4/485* (2010.01)
*C01G 23/04* (2006.01)

(52) U.S. Cl. .................. 429/231.1; 429/231.5; 423/598

(58) Field of Classification Search ........................ None
See application file for complete search history.

(56) References Cited

U.S. PATENT DOCUMENTS

| 4,513,143 A | 4/1985 | Ng et al. |
| 4,857,423 A | 8/1989 | Abraham et al. |
| 5,487,959 A | 1/1996 | Koksbang |
| 5,709,968 A | 1/1998 | Shimizu |
| 5,731,106 A | 3/1998 | Tsutsumi et al. |
| 5,763,119 A | 6/1998 | Adachi |
| 5,824,434 A | 10/1998 | Kawakami et al. |
| 5,858,573 A | 1/1999 | Abraham et al. |
| 6,004,698 A | 12/1999 | Richardson et al. |
| 6,045,952 A | 4/2000 | Kerr et al. |
| 6,074,777 A | 6/2000 | Reimers et al. |
| 6,207,326 B1 | 3/2001 | Kawakami et al. |
| 6,221,531 B1 | 4/2001 | Vaughey et al. |
| 6,291,107 B1 | 9/2001 | Shimizu |
| 6,387,571 B1 | 5/2002 | Lain et al. |
| 6,395,423 B1 | 5/2002 | Kawakami et al. |
| 6,506,516 B1 | 1/2003 | Wietelmann et al. |
| 6,780,545 B2 | 8/2004 | Birke-Salam et al. |

(Continued)

FOREIGN PATENT DOCUMENTS

EP   1057783   * 12/2000

OTHER PUBLICATIONS

Yoshio, M. et al., "Storage and cycling performance of Cr-modified spinel at elevated temperatures," *Journal of Power Sources*, vol. 101, pp. 79-85, Aug. 29, 2001; published by Elsevier Science B.V.

(Continued)

*Primary Examiner* — Jonathan Crepeau
(74) *Attorney, Agent, or Firm* — Foley & Lardner LLP

(57) ABSTRACT

A material comprising a lithium titanate comprising a plurality of primary particles and secondary particles, wherein the average primary particle size is about 1 nm to about 500 nm and the average secondary particle size is about 1 μm to about 4 μm. In some embodiments the lithium titanate is carbon-coated. Also provided are methods of preparing lithium titanates, and devices using such materials.

21 Claims, 12 Drawing Sheets

U.S. PATENT DOCUMENTS

| | | | |
|---|---|---|---|
| 6,827,921 | B1 | 12/2004 | Singhal et al. |
| 6,890,510 | B2 | 5/2005 | Spitler et al. |
| 2003/0091892 | A1 | 5/2003 | Watanabe et al. |
| 2003/0118912 | A1 | 6/2003 | Watanabe et al. |
| 2003/0190529 | A1 | 10/2003 | Kim et al. |
| 2004/0013944 | A1 | 1/2004 | Lee et al. |
| 2004/0028996 | A1 | 2/2004 | Hamamoto et al. |
| 2004/0029017 | A1 | 2/2004 | Besenhard et al. |
| 2004/0121239 | A1 | 6/2004 | Abe et al. |
| 2004/0157126 | A1 | 8/2004 | Belharouak et al. |
| 2004/0175622 | A9 | 9/2004 | Hu et al. |
| 2004/0191633 | A1 | 9/2004 | Johnson et al. |
| 2004/0202934 | A1 | 10/2004 | Zaghib et al. |
| 2004/0214091 | A1 | 10/2004 | Lim et al. |
| 2005/0019670 | A1 | 1/2005 | Amine et al. |
| 2005/0106470 | A1 | 5/2005 | Yoon et al. |
| 2005/0227143 | A1 | 10/2005 | Amine et al. |

OTHER PUBLICATIONS

Ravet, N. et al., "Electroactivity of natural and synthetic triphylite," *Journal of Power Sources*, vols. 97-98, pp. 503-507, Jul. 3, 2001; published by Elsevier Science B.V.

Davidson, I. J. et al., "Rechargeable cathodes based on $Li_2CR_xMn_{2-x}O_4$," *Journal of Power Sources*, vol. 54, pp. 205-208, 1995; published by Elsevier Science B.V.

Andersson, A. S. et al., "Lithium extraction/insertion in $LiFePO_4$: an X-ray diffraction and Mössbauer spectroscopy study," *Solid State Ionics*, vol. 130, pp. 41-52, Apr. 28, 2000; published by Elsevier Science B.V.

Xu, K. et al., "Lithium Bis(oxalate)borate Stabilizes Graphite Anode in Propylene Carbonate," *Electrochemical and Solid-State Letters*, vol. 5, No. 11, pp. A259-A262, 2002; published by The Electrochemical Society, Inc. Available electronically Sep. 10, 2002.

Kannan, A. M. et al., "Surface/Chemically Modified $LiMn_2O_4$ Cathodes for Lithium-Ion Batteries," *Electrochemical and Solid-State Letters*, vol. 5, No. 7, pp. A167-A169, 2002; published by The Electrochemical Society, Inc. Available electronically May 3, 2002.

Huang, H. et al., "Approaching Theoretical Capacity of $LiFePO_4$ at Room Temperature at High Rates," *Electrochemical and Solid-State Letters*, vol. 4, No. 10, pp. A170-A172, 2001; published by The Electrochemical Society, Inc. Available electronically Aug. 20, 2001.

Blyr, A. et al., "Self-Discharge of $LiMn_2O_4$/C Li-Ion Cells in Their Discharged State," vol. 145, No. 1, pp. 194-209, Jan. 1998; published by The Electrochemical Society, Inc.

Chen, Z. et al., "Reducing Carbon in $LiFePO_4$/C Composite Electrodes to Maximize Specific Energy, Volumetric Energy, and Tap Density," *J. Electrochem. Soc.*, vol. 149, No. 9, pp. A1184-A1189, 2002; published by The Electrochemical Society, Inc. Available electronically Jul. 29, 2002.

Yamada, A. et al., "Optimized $LiFePO_4$ for Lithium Battery Cathodes," *J. Electrochem. Soc.*, vol. 148, No. 3, pp. A224-A229, 2001; published by The Electrochemical Society, Inc.

Franger, S. et al., "Optimized Lithium Iron Phosphate for High-Rate Electrochemical Applications," *J. Electrochem. Soc.*, vol. 151, vol. 7, pp. A1024-A1027, 2004; published by The Electrochemical Society, Inc. Available electronically May 27, 2004.

Chung, S.-Y. et al., "Electronically conductive phospho-olivines as lithium storage electrodes," *Nature Materials*, vol. 1, pp. 123-128, Oct. 2002; published by Nature Publishing Group. Published online Sep. 22, 2002.

Padhi, A. K. et al., "Phospho-olivines as Positive-Electrode Materials for Rechargeable Lithium Batteries," *J. Electrochem. Soc.*, vol. 144, No. 4, Apr. 1997; published by The Electrochemical Society, Inc.

Amatucci, G. G. et al., "Failure Mechanism and Improvement of the Elevated Temperature Cycling of $LiMn_2O_4$ Compounds Through the Use of the $LiAl_xMn_{2-x}O_{4-z}F_z$ Solid Solution," *J. Electrochem. Soc.*, vol. 148, No. 2. pp. A171-A182, 2001; published by The Electrochemical Society, Inc.

Sigala, C. et al., "Influence of the Cr Content on the Electrochemical Behavior of the $LiCr_yMn_{2-y}O_4$ ($0 \leq y \leq 1$) Compounds," *J. Electrochem. Soc.*, vol. 148, No. 8, pp. A826-A832, 2001; published by The Electrochemical Society, Inc. Available electronically Jun. 25, 2001.

Kellomäki, M. et al., "Processing and properties of two different poly (ortho esters)," *Journal of Materials Science; Materials in Medicine*, vol. 11, pp. 345-355, 2000; published by Kluwer Academic Publishers.

Lee, H. S. et al., "Synthesis of a Series of Fluorinated Boronate Compounds and Their Use as Additives in Lithium Battery Electrolytes," *J. Electrochem. Soc.*, vol. 151, No. 9, pp. A1429-A1435, 2004; published by The Electrochemical Society, Inc.

Chen, J. et al., "Chemical Overcharge and Overdischarge Protection for Lithium-Ion Batteries," *Electrochemical and Solid-State Letters*, vol. 8, No. 1, pp. A59-A62, 2005; published by The Electrochemical Society, Inc.

Komaba, S. et al., "2-Vinylpyridine as Film-forming Additve [sic] to Suppress the Degradation of Carbon Anode by Dissolved Manganese for E/LiMn2O4 Rechargable Battery," Chemistry Letters, 2002, No. 12, pp. 1236-1237; published by The Chemical Society of Japan.

\* cited by examiner

FIG. 2
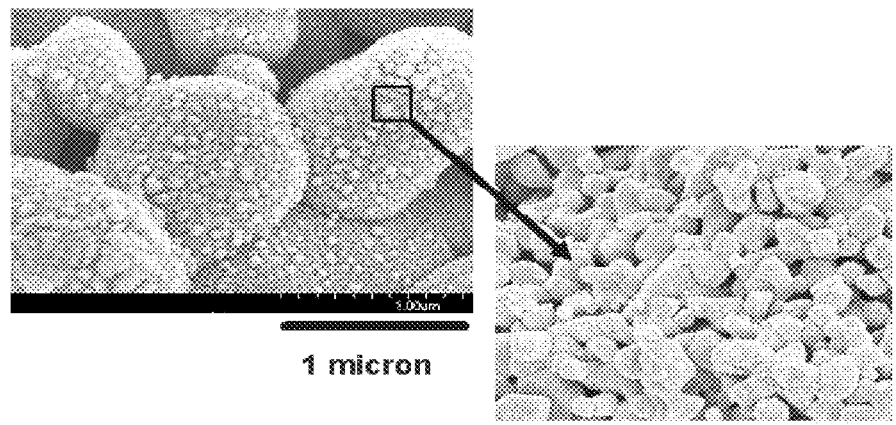
1 micron
FIG. 3 – COMPARATIVE EXAMPLE (PRIOR ART)
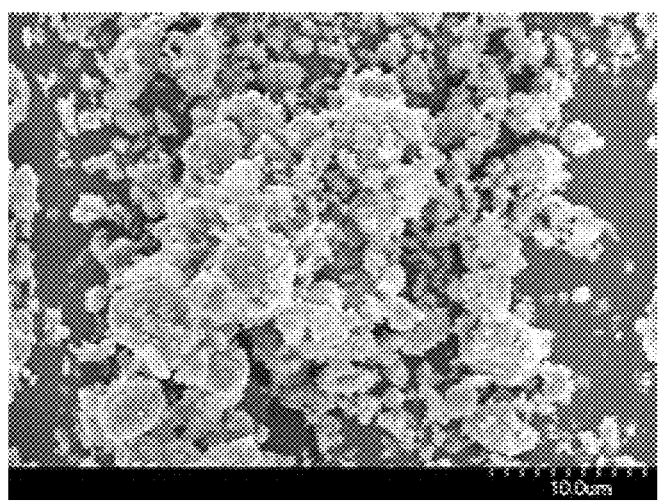

FIG. 4 – COMPARATIVE EXAMPLE (PRIOR ART)
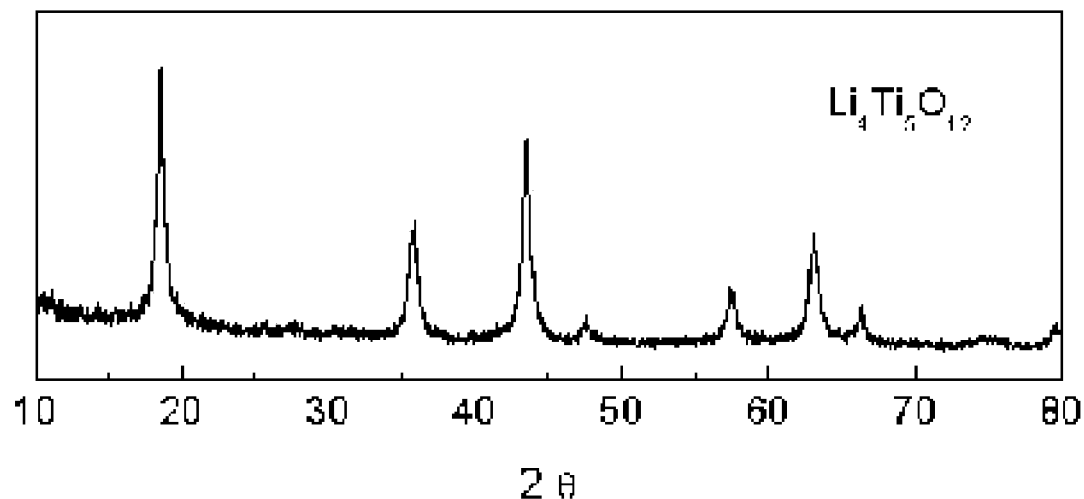
Fig. 5 – COMPARATIVE EXAMPLE (PRIOR ART)
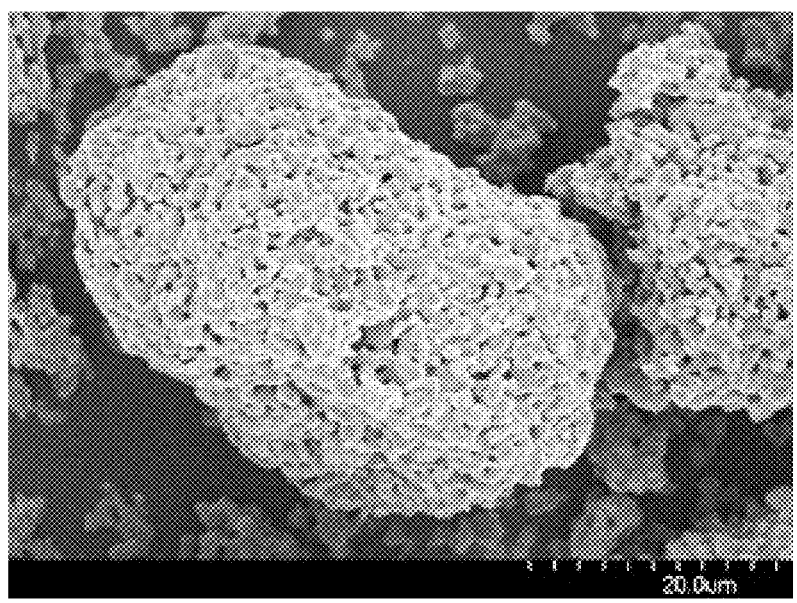

FIG. 8
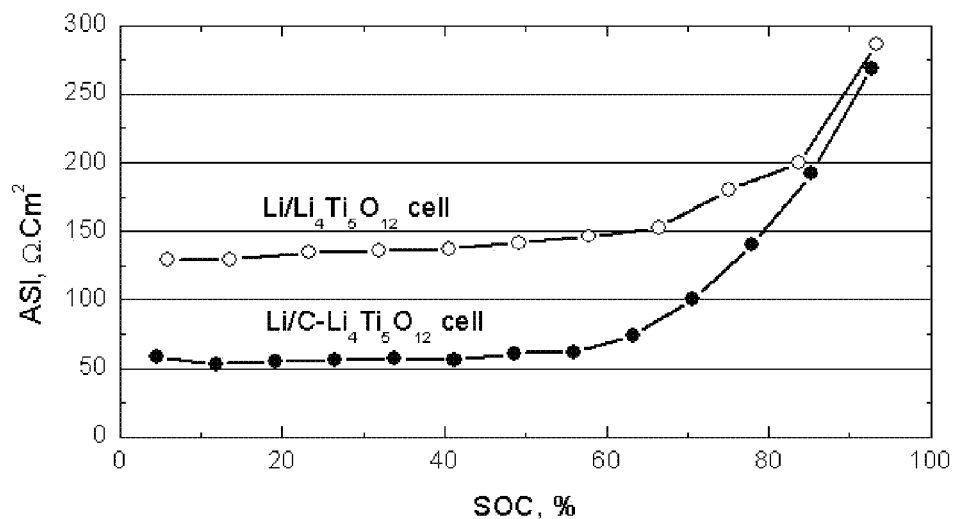
FIG. 9 – COMPARATIVE EXAMPLE (PRIOR ART)
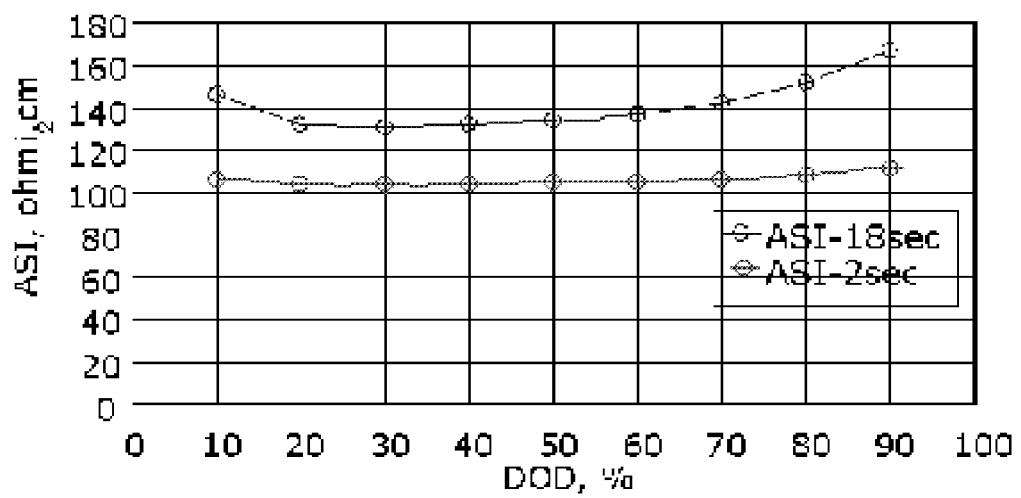

ELECTRODE MATERIALS AND LITHIUM BATTERY SYSTEMS

CROSS-REFERENCES TO RELATED APPLICATIONS

This application is based upon and claims the benefit of U.S. Provisional Application No. 60/753,575, filed on Dec. 23, 2005, the entire disclosure of which is incorporated herein by reference.

GOVERNMENT INTERESTS

This invention was made with Government support under Contract No. W-31-109-ENG-38 awarded by the Department of Energy. The Government has certain rights in this invention.

FIELD OF THE INVENTION

In general, the present invention relates to electrode materials for high energy storage, especially energy storage systems such as lithium secondary batteries and hybrid supercapacitors. In particular, lithium titanates and carbon-coated lithium titanate materials, processes of making the same, and the use of these materials as negative electrodes in high power and high energy lithium battery systems are provided. Also provided are processes for producing particles of $Li_4Ti_5O_{12}$ and carbon-coated $Li_4Ti_5O_{12}$ (C—$Li_4Ti_5O_{12}$), and processes for coating both primary and secondary particles of $Li_4Ti_5O_{12}$ with carbon using gas decomposition techniques.

BACKGROUND

Rechargeable lithium-ion batteries have become an important source of power for many applications due to their relatively low mass and high energy density. Rechargeable lithium-ion batteries have potential use as high power devices in large-scale applications such as electric vehicles (EV) and hybrid electric vehicles (HEV).

Graphite/$LiCoO_2$ is the most commonly used electrochemical couple in lithium-ion batteries, where the $LiCoO_2$ is at the cathode and the graphite is at the anode. Current, commercially available, lithium-ion batteries exhibit several weaknesses including:

i. at full charge, lithiated graphite ($LiC_6$) electrodes are highly reactive because operational voltages are very close to that of metallic lithium; and ii. the thermal degradation of passivation films formed at the graphite electrode, commonly referred to as solid electrolyte interfaces (SEI), occurs at temperatures as low as 100° C., and can easily lead to thermal runaway as a result of external heat and/or internal heating during the charging process. Both the operational voltage close to metallic lithium and the thermal degradation present safety concerns.

To overcome thermal runaway, battery manufacturers may incorporate a variety of components into their Li-ion cells, including electrolyte additives, shutdown separators, positive thermal coefficient (PTC) devices, or combinations of these safety components. The high expenses accompanying the introduction of these safety measures in lithium-ion batteries will likely reduce the penetration of this technology into industrial applications by cost-conscious developers.

In order to cost effectively address the safety limitations of lithium-ion cells, alternative anodes to graphite have been suggested. Alternatives such as the spinel $Li_4Ti_5O_{12}$, which operates at 1.5 V vs. $Li^0$, may provide an electrode system with better safety characteristics. Indeed, at this voltage the $Li_4Ti_5O_{12}$ anode will not form the conventional SEI films which usually form in graphite, because of the reduction of the organic species occurs at potentials less than one volt. In addition, unlike graphite anodes, no volume change is expected during the insertion of three lithium atoms into the spinel structure of $Li_4Ti_5O_{12}$, which leads to the formation of a rock-salt type $Li_7Ti_5O_{12}$ material with a zero-strain structural character. Furthermore, batteries based on $Li_4Ti_5O_{12}$ should exhibit good low temperature performance as no lithium plating can occur on $Li_4Ti_5O_{12}$ due to its potential being 1.5V higher than $Li/Li^+$. Moreover, the material can be coupled with a 4V electrode such as $LiCoO_2$, $LiNiO_2$, or $LiMn_2O_4$ to provide a system operating at 2.5 V, which is twice that of a nickel-metal hydride cell.

However, anodes based on $Li_4Ti_5O_{12}$ exhibit intrinsically poor electronic conductivity. Practical battery systems require the use of electrodes that have both good ionic conductivity, to allow rapid lithium-ion diffusion within the host, and good electronic conductivity, to transfer electrons from the host to the external circuit during the charging and discharging processes.

A need exists for electrode materials for high power and high energy lithium battery systems, that can provide high energy and high power with long cycle life and long calendar life, without the safety challenges of previously known systems.

SUMMARY

In one aspect, a material is provided comprising a lithium titanate comprising a plurality of primary particles and secondary particles, where the average primary particle size is about 1 nm to about 500 nm; and the average secondary particle size is about 1 μm to about 4 μm. In some embodiments, the lithium titanate further comprises a carbon-coating. In other embodiments the lithium titanate is $Li_4Ti_5O_{12}$. In some embodiments, the lithium titanate is a nano-structured lithium titanate.

In another aspect, a method of preparing lithium titanates is provided comprising: mixing a source of lithium ions and a source of titanium ions in a solvent; removing the solvent to form a solid mixture; and calcining the solid mixture. In some embodiments the method further comprises coating the particles of lithium titanate with a layer of carbon. In other embodiments the coating of the particles of lithium titanate with a layer of carbon further comprises: exposing the lithium titanate to a carbon source gas in a furnace; and heating the carbon source gas to deposit carbon on the lithium titanate.

In another aspect, a negative electrode is provided comprising a lithium titanate as embodied herein. In some embodiments, the lithium titanate is a carbon-coated lithium titanate. In some embodiments, the electrode further comprises a current collector, and a binder wherein the lithium titanate is coated onto the current collector. In some embodiments, the electrode further comprises a high-surface area carbon additive wherein the high-surface area carbon additive is present from about 0.05 wt % to about 15 wt %.

In another aspect, an electrochemical device is provided comprising a negative electrode as embodied herein; a positive electrode; and a non-aqueous electrolyte. In some embodiments the electrochemical device is a lithium secondary battery; and the positive electrode comprises a lithium metal oxide; and the positive and negative electrodes are separated from each other by a porous separator.

BRIEF DESCRIPTION OF THE DRAWINGS

FIG. 2 is an scanning electron microscope (SEM) image of nano-structured $Li_4Ti_5O_{12}$, where the secondary particles are between 1 and 2 μm in size and the primary particle size is about 20 nm.

FIG. 3 (comparative example) is an SEM image of $Li_4Ti_5O_{12}$ prepared by the method disclosed in U.S. Pat. No. 6,890,510.

FIG. 4 (comparative example) is a powder x-ray diffraction (XRD) pattern of $Li_4Ti_5O_{12}$ prepared by the disclosed indicated in U.S. Pat. No. 6,890,510.

FIG. 5 (comparative example) is an SEM image of $Li_4Ti_5O_{12}$ prepared by conventional solid state reactions, where the secondary particles are approximately 20 μm in size and the primary particle size is 2 to 3 μm.

FIG. 8 is a graph of the area specific impedance v. state of the charge of a [Li/C—$Li_4Ti_5O_{12}$] cell with 1% carbon-coating on $Li_4Ti_5O_{12}$, compared to a [Li/$Li_4Ti_5O_{12}$] cell without carbon-coating on $Li_4Ti_5O_{12}$.

FIG. 9 (comparative example) is a graph of hybrid pulse power characteristics (HPPC) v. depth of the discharge of [$Li_4Ti_5O_{12}$/$Li_{1.06}Mn_{1.94}O_4$] cell, using 5 C pulse discharge. The $Li_4Ti_5O_{12}$ used was prepared by conventional solid state reactions where the secondary particles are approximately 20 μm in size and the primary particle size is between about 2 to 3 μm.

DETAILED DESCRIPTION

Figure 1:
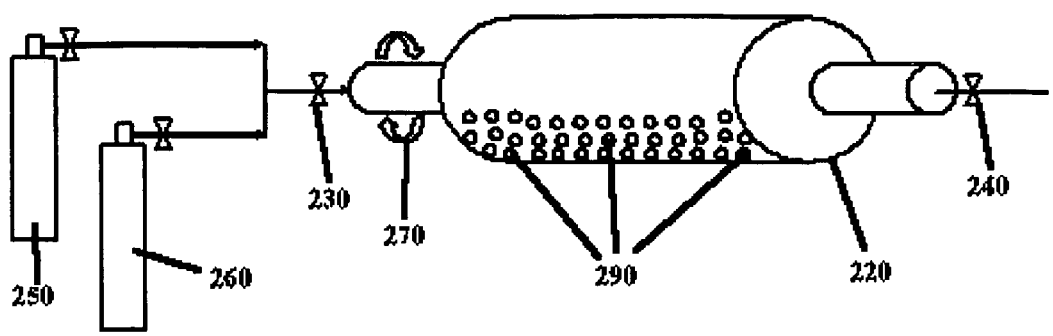
FIG. 1 is a schematic view of a quartz rotary furnace and other equipment used to coat metal oxides with carbon.

To overcome the poor electronic conductivity of lithium titanates, in particular $Li_4Ti_5O_{12}$, it has been found to be advantageous to reduce the macro-size particles of lithium titanates to nano-scale dimensions, by preparing particles having both primary particles of nanometer size dimensions and secondary particles of micrometer size dimensions, whereby the primary particles are building blocks of the secondary particles. As used herein, the term nano-structured materials refers to such nanometer/micrometer sized primary particles. Optionally, another way to improve the conductivity of lithium titanates, in particular $Li_4Ti_5O_{12}$, is to coat the surface of the $Li_4Ti_5O_{12}$ powder with a homogenous, electronically conductive layer of carbon. As a result of one or both of the homogeneous carbon-coating and the nano-sized and micrometer-sized dimensions, a gain in the energy density of electrodes based upon lithium titanates may be achieved, as compared to conventional electrodes.

In one aspect, a material is provided comprising a lithium titanate comprising a plurality of primary and secondary particles, wherein the primary particles have an average size from about 1 nm to about 500 nm, and the secondary particles have an average size from less than about 1 μm to about 4 μm. In some embodiments the primary particles have an average size from about 5 nm to about 100 nm, and the secondary particles have an average size from less than about 1 μm to about 2 μm.

In some embodiments, the lithium titanate further comprises a carbon-coating. The carbon-coating may be present at about 20 wt % or less, in some embodiments, or the carbon-coating may be present at about 5 wt % or less, in other embodiments, or the carbon-coating may be present at about 2 wt % or less, in yet other embodiments. In some embodiments, the lower limit for the carbon-coating is about 0.1 wt %. Thus, in some embodiments the carbon-coating is present at from about 0.1 wt % to about 20 wt %, from about 0.1 wt % to about 5 wt %, in other embodiments, and from about 0.1 wt % to about 2 wt %, in yet other embodiments. In some embodiments, the lithium titanate is $Li_4Ti_5O_{12}$. In other embodiments, the lithium titanate is a nano-structured lithium titanate.

In another aspect, methods for preparing lithium titanates are provided. In some embodiments, a source of lithium ions and a source of titanium ions are mixed in a solvent, the solvent is then removed to form a solid mixture, and the solid mixture is calcined. Sources of lithium ions that may be used with the present disclosure include, but are not limited to lithium oxide, lithium peroxide, lithium hydroxide, lithium carbonate, lithium nitrate, lithium oxalate, lithium acetate, lithium chloride, lithium fluoride, lithium iodide, or a mixture of any two or more thereof. Sources of titanium ions that may be used with the present disclosure include, but are not limited to titanium oxide anatase, titanium oxide rutile, an aqueous solution comprising titanium ions such as oxo titanium (IV)

dinitrate hydrate, an organic solution comprising titanium ions such as titanium (III) chloride-dimethyl ether complex, titanium (III) chloride-tetrahydrofuran complex, titanium (IV) chloride-dimethyl ether complex, or a mixture of any two or more thereof. Suitable solvents include, but are not limited to organic solvents such as a carboxylic acid; an alcohol such as methanol, ethanol, propanol, iso-propanol; an ester such as ethyl acetate; and ether such as methyl ether, ethyl ether, methyl tert-butyl ether; a ketone such as acetone or methyl tert-butyl ketone, or a mixture of any two or more thereof. Optionally the solid mixture may be crushed prior to the calcining step to increase the surface area of the solid mixture. As used herein, crushed or crushing refers to using ball-mills, grinders, or blenders to reduce the particle size of a material. In some embodiments, the calcining is done at from about 600° C. to about 1000° C. to form the lithium titanate embodied above. In some embodiments, the lithium titanate that is prepared is $Li_4Ti_5O_{12}$. In other embodiments, the lithium titanate is a nano-structured lithium titanate.

In another aspect, methods for preparing carbon-coated lithium titanates are provided. Some embodiments, include preparing the lithium titanate as embodied herein, and coating the particles of the lithium titanate with carbon.

Referring to FIG. 1, for carbon-coating in general, an amount of a lithium titanate is first put into a furnace 220, and preheated to a predetermined temperature. A carrier gas and carbon source are then introduced to the furnace 220 through an inlet valve 230 from a carrier gas tank 250 and a carbon source tank 260. The carbon source decomposes at the temperature of the furnace 220, and any off-gas is then exited from the furnace through the outlet valve 240. Optionally, milling material 290 may be added to the furnace to keep the lithium titanate milled into small particles. Such milling material may be selected from any compatible milling material known to those of skill in the art, and may include but is not limited to zirconia or yttria balls. In some embodiments, the furnace is selected from a rotary furnace, a fluidized bed furnace, or a static furnace. The carrier gas is typically selected from, but is not limited to, carbon dioxide; inert gases including nitrogen, helium, argon, or a mixture of any two or more thereof. Carbon sources suitable for use in the embodied methods and materials generally decompose between about 100° C. and about 1300° C. to generate carbon and off-gases. Carbon sources may typically be selected from materials having from 1 to about 20 carbon atoms, including but not limited to acetylene, butane, 1,3 butadiene, 1-butene, cis-2-butene, trans-2-butene, 2,2-dimethylpropane, ethane, ethylene, hexane, heptane, isobutane, isobutylene, methane, 2-methylbutane, pentane, propane, propylene, octane, toluene, and/or mixtures of any two or more thereof. In some embodiments, the coating of particles of lithium titanate with carbon is achieved with a furnace temperature from about 400° C. to about 1200° C. in the presence of a gaseous mixture comprising a carbon source and a mixture of inert gas and $CO_2$.

In some embodiments, $CO_2$ gas is used as a carrier gas for coating lithium titanate materials that are not stable to reducing atmospheres. When hydrocarbons are decomposed at elevated furnace temperatures, both hydrogen and elemental carbon are generated (Equation 1).

Equation 1

The elemental carbon is then deposited on the surface of the metal oxide at the elevated furnace temperature resulting in the generation of carbon monoxide, until equilibrium is reached, as shown in Equation 2.

Equation 2

With both hydrogen and carbon monoxide present in the off-gas in the furnace, a reforming reaction occurs, regenerating elemental carbon from the carbon monoxide (Equation 3), which in turn can act to reduce more metal oxide and drive the equilibrium reaction further to the reduced metal oxide as in Equation 2.

Equation 3

The use of $CO_2$ as a carrier gas may alleviate the hydrogen generation problem. In some embodiments, the use of $CO_2$ as a carrier gas allows for the carbon-coating of lithium titanates and any other metal oxides, or lithium metal oxides, that are otherwise easily reduced, such as, but not limited to, $LiCoO_2$, $LiNiO_2$, $LiNi_{1-x}Co_yMet_zO_2$, $LiMn_{0.5}Ni_{0.5}O_2$, $LiMn_{1/3}Co_{1/3}Ni_{1/3}O_2$, $LiMn_2O_4$, $Li_{1+x}Mn_{2-y}B'_yO_4$, $LiFeO_2$, $LiMet'''_{0.5}Mn_{1.5}O_4$, vanadium oxide, or a mixture of any two or more thereof, wherein Met is Al, Mg, Ti, B, Ga, Si, Mn, or Co; Met''' is Al, Mg, Ti, B, Ga, Si, Ni, or Co; B' is Ni, Co, Zn, or Cu, and wherein 0<x<0.3, 0<z<0.5, and 0<y<0.5. As eluded to above, the use of $CO_2$ may not act to completely eliminate the reducing atmosphere, only lessen it as compared to a non-$CO_2$ containing carrier gas.

In one aspect, methods for preparing carbon-coated lithium titanates are provided comprising: exposing a lithium titanate to a carbon source in a furnace, and heating the carbon source to deposit carbon on the lithium titanate. In some embodiments, the carbon source is mixed with $CO_2$. In some embodiments the lithium titanate is $Li_4Ti_5O_{12}$. In some embodiments the heating is from about 100° C. to about 1300° C. In other embodiments, the heating is from about 400° C. to about 700° C. In some embodiments, heating is continued until the amount of carbon-coating in the carbon-coated lithium titanate is about 20 wt % or less. In some embodiments, the amount of carbon-coating in the carbon-coated lithium titanate is from about 0.2 wt % to about 20 wt %. In other embodiments, heating is continued until the amount of carbon-coating in the carbon-coated lithium titanate is about 5 wt % or less. In yet other embodiments, heating is continued until the amount of carbon coating in the carbon-coated lithium titanate is 2 wt % or less.

Carbon-coating of metal oxides generally described, it is illustrative to discuss a non-limiting example of the method for carbon-coating of metal oxides or other lithium titanates. $Li_4Ti_5O_{12}$ is placed in a quartz rotary furnace, which is then preheated to approximately 700° C. A mixture of 97% $CO_2$ gas and 3% propylene, by weight, is then introduced to the quartz rotary furnace at 700° C. The flow of the carbon source gas and carrier gas are determined based on the expected $Li_4Ti_5O_{12}$/carbon ratio, and may need to be determined experimentally. The decomposition process, or cracking, of propylene begins at around 400° C., therefore, the temperature for carbon-coating of the $Li_4Ti_5O_{12}$ with propane may be chosen to be from about 400° C. to about 700° C. Other carbon source gases may require higher or lower temperatures depending on the cracking temperatures, and it is well within the skill in the art to select the appropriate temperature for the carbon source used. As the carbon source gas enters the furnace chamber, the propane is decomposed to $C_{(s)}$ and $H_{2(g)}$. The $C_{(s)}$ then forms a homogenous layer on the $Li_4Ti_5O_{12}$. Alternatively, a mixture of two or more carbon source gases may be used, and each may have a different cracking temperature that will dictate the appropriate temperature range for the coating process. This technique may be used to carbon-coat metal oxide materials other than $Li_4Ti_5O_{12}$, and may be used for coating at high temperatures.

The temperature limits are bounded by the metal oxide's ability to withstand higher temperatures and the carbon source gas(es) used.

In another aspect, electrodes are provided comprising lithium titanates as embodied herein. In other embodiments, the lithium titanate is a carbon-coated lithium titanate. In some embodiments, the electrode comprises a current collector and a binder, wherein the lithium titanate is coated onto the current collector (e.g. an aluminum current collector). Binders compatible with the present disclosure include, but are not limited to polyvinyldifluoride (PVDF). In some embodiments, the carbon-coated lithium titanate is carbon-coated $Li_4Ti_5O_{12}$. In other embodiments, the electrode further comprises a high-surface area carbon additive, present from about 0.05 wt % to about 15 wt %. High-surface area carbon additives include, but are not limited to, carbon black, and acetylene black. As used herein, high-surface area carbon additives are those in which the surface area is greater than 60 $m^2/g$.

In conventional lithium-ion cells, copper metal foil is typically used as a negative current collector in electrodes due to its good conductivity and electrochemical stability within the operating voltage of the graphite anode. However, when negative electrodes made from copper foil and $Li_4Ti_5O_{12}$ are coupled with certain positive electrode materials, the copper foil may dissolve in the electrolyte if an over-discharge occurs. Such certain positive electrode materials may be selected from, but are not limited to materials such as $LiCoO_2$, $LiNiO_2$, $LiNi_{1-x}Co_yMet_zO_2$, $LiMn_{0.5}Ni_{0.5}O_2$, $LiMn_{1/3}Co_{1/3}Ni_{1/3}O_2$, $LiFePO_4$, $LiMn_2O_4$, $Li_{1+x}Mn_{2-y}B'_yO_4$, $LiFeO_2$, $LiMet'''_{0.5}Mn_{1.5}O_4$, vanadium oxide, or a mixture of any two or more thereof, wherein Met is Al, Mg, Ti, B, Ga, Si, Mn, or Co; Met''' is Al, Mg, Ti, B, Ga, Si, Ni, or Co; B' is Ni, Co, Zn, or Cu, and wherein $0<x<0.3$, $0<z<0.5$, and $0<y<0.5$. To avoid the possible dissolution of copper, other metals may be used as the negative current collector. Thus, in some embodiments, aluminum current collectors are provided, and in other embodiments the aluminum current collect is a negative current collector. In other embodiments, negative electrodes comprise a lithium titanate such as $Li_4Ti_5O_{12}$, or carbon-coated $Li_4Ti_5O_{12}$, on an aluminum substrate. Aluminum is advantageous as it is less dense than copper, and is typically less expensive than copper. Therefore, the use of aluminum as a current collector, for both negative and positive electrodes, may significantly reduce the weight and the cost of Li-ion cells while not degrading during over-discharge of the cell.

In another aspect, electrochemical devices are provided comprising a negative electrode comprising a lithium titanate as embodied herein, a positive electrode, and a non-aqueous electrolyte. In other embodiments, the lithium titanate is a carbon-coated lithium titanate. In some embodiments, the positive and negative electrodes are separated by a porous separator. In some embodiments, the carbon-coated lithium titanate is carbon-coated $Li_4Ti_5O_{12}$. Positive electrodes compatible with the present disclosure include, but are not limited to: $LiCoO_2$, $LiNiO_2$, $LiNi_{1-x}Co_yMet_zO_2$, $LiMn_{0.5}Ni_{0.5}O_2$, $LiMn_{1/3}Co_{1/3}Ni_{1/3}O_2$, $LiFePO_4$, $LiMn_2O_4$, $Li_{1+x}Mn_{2-y}B'_yO_4$, $LiFeO_2$, $LiMet'''_{0.5}Mn_{1.5}O_4$, vanadium oxide, or a mixture of any two or more thereof, wherein Met is Al, Mg, Ti, B, Ga, Si, Mn, or Co; Met''' is Al, Mg, Ti, B, Ga, Si, Ni, or Co; B' is Ni, Co, Zn, or Cu, and wherein $0<x<0.3$, $0<z<0.5$, and $0<y<0.5$. In some embodiments, the positive electrode comprises a spinel manganese oxide with a formula of $Li_{1+x}Mn_{2-z}Met'''_yO_{4-m}X'_n$, wherein Met''' is Al, Mg, Ti, B, Ga, Si, Ni, or Co; X' is S or F; and wherein $0<x<0.3$, $0<z<0.5$, $0<y<0.5$, $0<m<0.5$, and $0<n<0.5$. In some embodiments, the material comprising the positive electrode may further comprise a surface coating selected from a metal oxide, a metal hydroxide, a metal phosphate, or metal fluoride. Metal oxides that may be used include, but are not limited to, $ZrO_2$, $TiO_2$, $ZnO$, $WO_3$, $Al_2O_3$, $MgO$, $SiO_2$, $SnO_2$, or a mixture of any two or more thereof. Suitable metal hydroxides include, but are not limited to, $Al(OH)_3$. Suitable metal phosphates include, but are not limited to, $AlPO_4$. Suitable metal fluorides include, but are not limited to $AlF_3$ or $ZnF_2$. Suitable non-aqueous electrolytes comprise a polar aprotic solvent selected from, but not limited to ethylene carbonate, propylene carbonate, dimethyl carbonate, diethyl carbonate, ethyl methyl carbonate, gamma-butyrolactone, sulfolane, or a mixture of any two or more thereof. In some embodiments, the non-aqueous electrolyte also comprises an alkali metal salt, such as a lithium salt, dissolved in the polar aprotic solvent. Suitable lithium salts include, but are not limited to, $Li[B(C_2O_4)_2]$, $Li[BF_2(C_2O_4)]$, $Li[PF_2(C_2O_4)_2]$, $LiClO_4$, $LiBF_4$, $LiAsF_6$, $LiPF_6$, $Li[CF_3SO_3]$, $Li[N(CF_3SO_2)_2]$, $Li[C(CF_3SO_2)_3]$, $Li[N(SO_2C_2F_5)_2]$, lithium alkyl fluorophosphates, or a mixture of any two or more thereof. In some embodiments, the alkali metal salt is present in a concentration of from about 0.5 M to about 2.5 M. In some embodiments, electrochemical devices embodied herein comprise a secondary battery.

In another aspect, additives as disclosed in co-pending U.S. patent application Ser. Nos. 11/297,120; 11/338,902; and 10/857,365 and in U.S. Provisional Patent Application No. 60/657,850, may be used in the non-aqueous electrolytes embodied herein. In some embodiments, non-aqueous electrolytes comprise an alkali metal salt as described herein, a polar aprotic solvent as described herein, and an additive that is reduced or polymerized at a voltage higher than the nominal voltage of carbon-coated lithium titanate negative electrodes. In some such embodiments, the carbon-coated lithium titanate is carbon-coated $Li_4Ti_5O_{12}$. Additives that may be reduced or polymerized at a voltage higher than the nominal voltage of carbon-coated lithium titanate negative electrodes include, but are not limited to 1,2-divinyl furoate, 1,3-butadiene carbonate, 1-vinylazetidin-2-one, 1-vinylaziridin-2-one, 1-vinylpiperidin-2-one, 1-vinylpyrrolidin-2-one, 2,4-divinyl-1,3-dioxane, 2-amino-3-vinylcyclohexanone, 2-amino-3-vinylcyclopropanone, 2-amino-4-vinylcyclobutanone, 2-amino-5-vinylcyclopentanone, 2-vinyl-[1,2]oxazetidine, vinyl methyl carbonate, 2-vinylaminocyclohexanol, 2-vinylaminocyclopropanone, 2-vinyloxetane, 2-vinyloxy-cyclopropanone, 3-(N-vinylamino)cyclohexanone, 3,5-divinyl furoate, 3-vinylazetidin-2-one, 3-vinylaziridin-2-one, 3-vinylcyclobutanone, 3-vinylcyclopentanone, 3-vinyloxaziridine, 3-vinyloxetane, 3-vinylpyrrolidin-2-one, 4,4-divinyl-3-dioxolan-2-one, 4-vinyltetrahydropyran, 5-vinylpiperidin-3-one, allylglycidyl ether, butadiene monoxide, butyl vinyl ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene silicate, vinyl ethylene sulfate, vinyl ethylene sulfite, vinyl methacrylate, vinyl phosphate, vinyl-2-furoate, vinylcylopropanone, vinylethylene oxide, β-vinyl-γ-butyrolactone, (divinyl)(methoxy)(trifluoro)cyclotriphosphazene, (trivinyl)(difluoro)(methoxy)cyclotriphosphazene, (vinyl)(methoxy)(tetrafluoro)-cyclotriphosphazene, (aryloxy)(tetrafluoro)(methoxy)cyclotriphosphazene, (diaryloxy)(trifluoro)(methoxy)cyclotriphosphazene compounds, aryloxypyrrole, aryloxy ethylene sulfate, aryloxy pyrazine, aryloxy-carbazole trivinylphosphate, aryloxy-ethyl-2-furoate, 2-aryloxy-cyclopropanone, aryloxy-o-terphenyl, aryloxy-pyridazine, butyl-aryloxy-ether, divinyl diphenyl ether, (tetrahydro-furan-2-yl)-vinylamine, divinyl methoxybipyridine, methoxy-4-vinylbiphenyl, vinyl methoxy carbazole, vinyl methoxy piperidine, vinyl methoxypyrazine, allylanisole, 1-divinylimidazole, 3-vinyltetrahydrofuran, divinyl furan, divinyl methoxy furan, divinylpyrazine, vinyl methoxy imidazole, vinylmethoxy pyrrole, vinyl-tetrahydrofuran, 2,4-divinyl isooxazole, 3,4-divinyl-1-methyl pyrrole, aryloxyoxetane, aryloxy-phenyl carbonate, aryloxy-piperidine, aryloxy-tetrahydrofuran, 2-aryl-cyclopropanone, 2-diaryloxy-furoate, 4-allylanisole, aryloxy-carbazole, aryloxy-2-furoate, aryloxy-crotonate, aryloxy-cyclobutane, aryloxy-cyclopentanone, aryloxy-cyclopropanone, aryloxy-cycolophosphazene, aryloxy-ethylene silicate, aryloxy-ethylene sulfate, aryloxy-ethylene sulfite, aryloxy-imidazole, aryloxy-methacrylate, aryloxy-phosphate, aryloxy-pyrrole, aryloxy-quinoline, diaryloxy-cyclotriphosphazene, diaryloxy ethylene carbonate, diaryloxy furan, diaryloxy methyl phosphate, diaryloxy-butyl carbonate, diaryloxy-crotonate, diaryloxy-diphenyl ether, diaryloxy-ethyl silicate, diaryloxy-ethylene silicate, diaryloxy-ethylene sulfate, diaryloxyethylene sulfite, diaryloxy-phenyl carbonate, diaryloxy-propylene carbonate, diphenyl carbonate, diphenyl diaryloxy silicate, diphenyl divinyl silicate, diphenyl silicate, divinyl methoxydiphenyl ether, divinyl phenyl carbonate, methoxycarbazole, 2,4-dimethyl-6-hydroxy-pyrimidine, vinyl methoxyquinoline, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o-terphenyl, N-methyl pyrrole, naphthalene, 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]-undecane, 3,9-diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9-diethylidene-1,5,7,11-tetraoxaspiro[5.5]undecane, or a mixture of any two or more thereof.

In another aspect, secondary Li-ion batteries are provided comprising a negative electrode comprising a lithium titanate as embodied herein, for example, $Li_4Ti_5O_{12}$, a positive electrode comprising $LiMn_2O_4$, and a non-aqueous electrolyte. In some embodiments, the lithium titanate is carbon-coated $Li_4Ti_5O_{12}$. In other embodiments, such secondary Li-ion batteries are a 2.5V battery system with high power characteristics for application in hybrid electric vehicles.

For the purposes of this disclosure and unless otherwise specified, "a" or "an" means "one or more."

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXPERIMENTAL

Example 1

$Li_4Ti_5O_{12}$ spinel was prepared by reacting $Li_2CO_3$ and $TiO_2$ (anatase) in the required stoichiometric amounts. The precursors were mixed by ball-milling in ethanol for 24 h to form a viscous slurry. The viscous slurry was then dried at 60° C. under vacuum, and the resulting solid thoroughly ground. The reground solid was then heated for 24 h, in air, at 700° C. $Li_4Ti_5O_{12}$, was recovered as an agglomerated white powder. FIG. 2 shows the SEM images of the $Li_4Ti_5O_{12}$, after crushing the agglomerates. In this case, the secondary particle size is less than about 1 μm, the primary particle size is about 20 nm, and the surface area is approximately 2 $m^2/g$. Materials of these dimensions may easily be slurried during subsequent coating processes due to the low surface area of the material (i.e. less than 8 $m^2/g$). In addition, the small scale of the primary particles allows for fast lithium diffusion out of the material, which in combination with carbon-coating can improve the ionic and electronic conductivity of the particles, thus possibly leading to significant power capability of the $Li_4Ti_5O_{12}$.

Comparative Example 1

The morphology of the material prepared in Example 1 is different from that of $Li_4Ti_5O_{12}$ prepared according to methods disclosed in U.S. Pat. No. 6,890,510 (FIG. 3). $Li_4Ti_5O_{12}$, prepared by such methods, exhibits very high surface areas (over 90 $m^2/g$) as indicated by the broad XRD peak pattern as shown in FIG. 4. Such broad patterns may be indicative of high surface area materials. Conventional solid state processes used to prepare $Li_4Ti_5O_{12}$, typically involve mixing $Li_2CO_3$ and $TiO_2$ (anatase) solid materials, in the required stoichiometric amounts, and heating the mixture at 600° C. for 10 h to allow for the decomposition of the precursors, and then heating at 950° C. for 20 h to form the $Li_4Ti_5O_{12}$. $Li_4Ti_5O_{12}$ materials prepared by this method have a secondary particle size averaging approximately 20 μm, and a primary particle size of approximately 2 to 3 μm (FIG. 5).

Comparative Example 2

Figure 6:
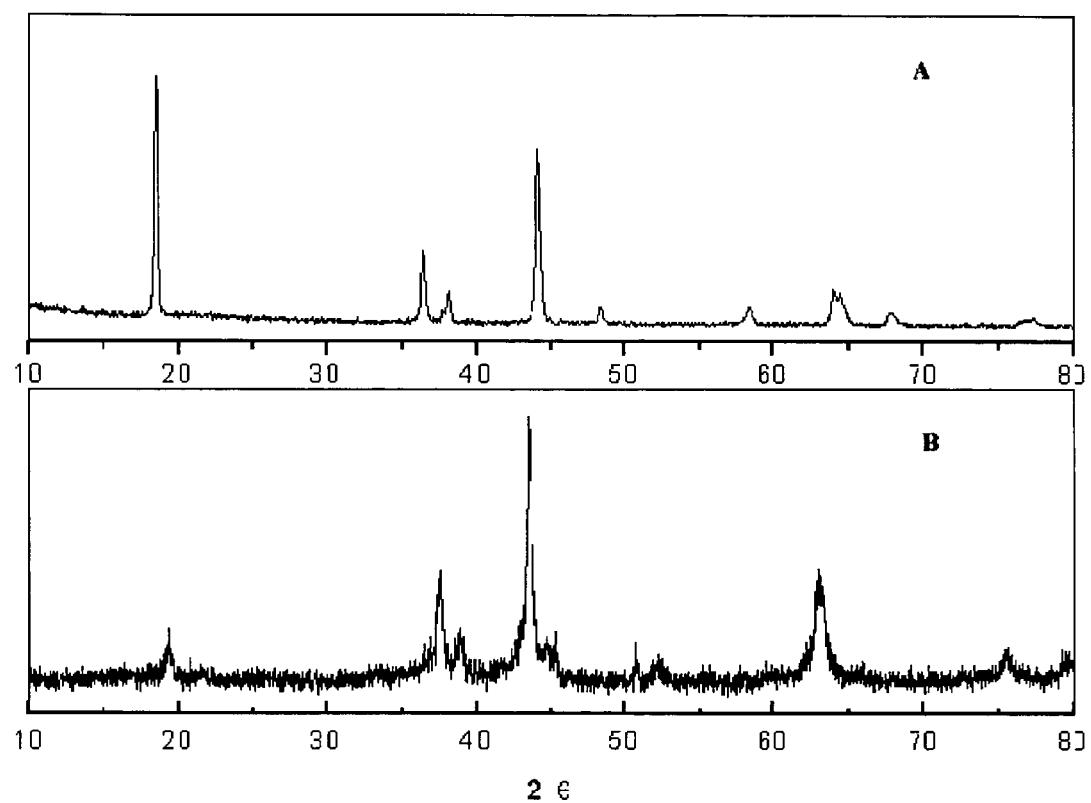
FIG. 6 is a powder XRD pattern of a layered oxide powder (A) before carbon-coating and (B) after carbon-coating without added $CO_2$ gas to the carbon source gas.

In this example, a 97% nitrogen and 3% propylene gas mixture, by weight, was introduced to a rotary furnace containing 50 g of $LiNi_{0.5}Co_{0.5}O_2$, preheated to 700° C. FIG. 6 shows an XRD pattern of the $LiNi_{0.5}Co_{0.5}O_2$ before (FIG. 6A) and after (FIG. 6B) carbon-coating with the $N_2$/propylene gas mixture. Prior to the carbon-coating process, the material shows a pure layered structure as evident from FIG. 6A, however, after the carbon deposition process, the material was completely decomposed to nickel oxide and manganese oxide as evidenced in FIG. 6B.

Example 2

Figure 7:
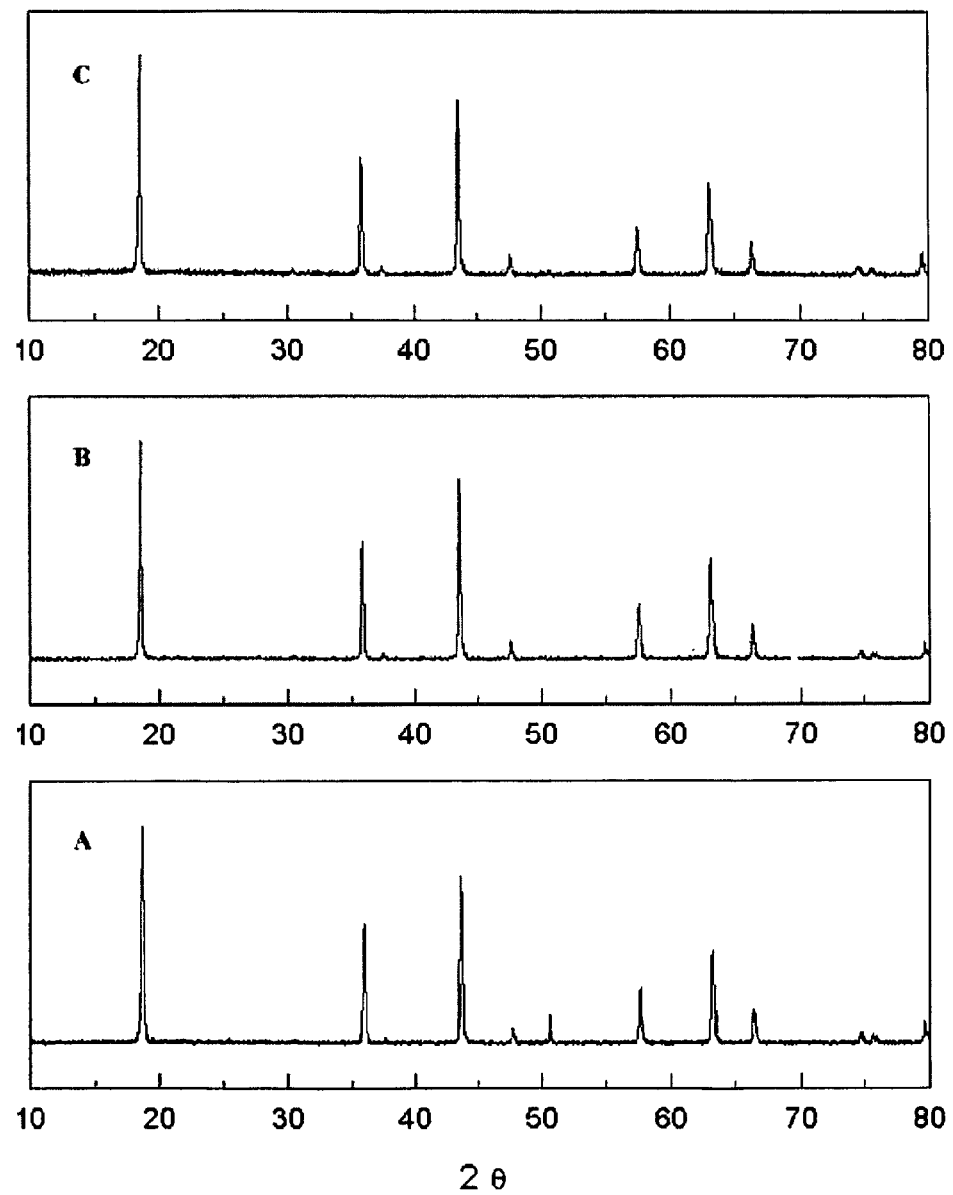
FIGS. 7A, 7B, and 7C are powder XRD patterns of (7A) $Li_4Ti_5O_{12}$ spinel powder, (7B) C—$Li_4Ti_5O_{12}$ (carbon-coated $Li_4Ti_5O_{12}$) spinel powder coated with 0.5% carbon, and (7C) C—$Li_4Ti_5O_{12}$ spinel product coated with 1% carbon.

In this example, a 97% $CO_2$ and 3% propylene gas mix, by weight, was introduced to a rotary furnace preheated to 700° C. and containing 50 g of $Li_4Ti_5O_{12}$, prepared by conventional solid state processes (see Example 1, above). FIGS. 7A, 7B, and 7C show XRD patterns of nano-structured $Li_4Ti_5O_{12}$ prepared at 950° C., without carbon-coating (FIG. 7A); with a 0.5 wt % carbon coating (FIG. 7B), and with a 1 wt % carbon-coating (FIG. 7C). After completion of the coating experiment, the $Li_4Ti_5O_{12}$ material was observed to have turned black from its initial white color, thereby indicating the presence of carbon on the surface of the $Li_4Ti_5O_{12}$. Very little decomposition of the $Li_4Ti_5O_{12}$ was observed as evidenced by the similarities of the XRD patterns prior to carbon-coating and after carbon-coating, despite the change in color.

Example 3

The area-specific impedance (ASI) of different $Li_4Ti_5O_{12}$ negative electrodes as a function of the state of the charge of the cells was measured. FIG. 8 shows the ASI of different $Li_4Ti_5O_{12}$ negative electrodes. The ASI measurements were performed using a 30 s current interruption method during the charge/discharge cycling. As shown in FIG. 8, the cell having a negative electrode comprising carbon-coated $Li_4Ti_5O_{12}$ (Li/C—$Li_4Ti_5O_{12}$) shows much lower impedance than the cell containing the uncoated $Li_4Ti_5O_{12}$ (Li/$Li_4Ti_5O_{12}$). Thus, it appears that the very low impedance values of the carbon-coated $Li_4Ti_5O_{12}$ may account, at least in part, for the increase in the overall conductivity of the carbon-coated $Li_4Ti_5O_{12}$.

Example 4

A 2.5 V Li-ion cell was tested using the HPPC test, as described by the FreedomCAR test manual for application in hybrid electric vehicles. The configuration of the cell was: [$Li_4Ti_5O_{12}$//1.2 M $LiPF_6$, EC/PC/DMC (1:1:3)//$Li_{1.06}Mn_{1.94}O_4$]. As used herein, the bracketed notation is used to describe cells with the following convention: [anode//electrolyte//cathode]. The negative electrode consisted of $Li_4Ti_5O_{12}$ that was mixed with 10% acetylene black to enhance the conductivity of electrode, and 10% PVDF binder in N-methyl-2-pyrrolidinone (NMP) as a solvent to form a slurry. The slurry was then coated onto an Cu-foil. The positive electrode consisted of 80% $Li_{1.06}Mn_{1.94}O_4$ active material, 10% acetylene black, 10% PVDF binder, and was then coated onto an Al-current collector. The laminates were dried inside a vacuum oven to remove all solvent. The final electrodes were obtained after calendaring the laminates to about 35% porosity. The HPPC test was conducted with the cells (32 $cm^2$ test fixture, 15.5 $cm^2$ effective surface) in accordance with the FreedomCAR test manual.

The HPPC test is intended to establish the discharge power capability at the end of an 18 s discharge current, and the cell regeneration power capability over 2 s of a regeneration current pulse as a function of depth of discharge (DOD). The test is used to determine the total available state of charge and energy swings that can be utilized within the HEV operating voltage limits for specified discharge power and regeneration levels. In the HPPC test, ASI values are measured and acceptable values are typically determined to be less than 30 Ohm·$cm^2$ for the 18 s pulse discharge.

As a comparative example, FIG. 9 shows the HPPC test results of the [$Li_4Ti_5O_{12}$//1.2 M $LiPF_6$ in EC/PC/DMC (1:1:3)//$Li_{1.06}Mn_{1.94}O_4$] cell, using 5 C rate pulse discharge. The $Li_4Ti_5O_{12}$ negative electrode used in the example was prepared by conventional solid state reactions that result in a particle morphology as shown in FIG. 5. The ASI of the cell based on this material was approximately 140 Ohm·$cm^2$ for the 18 s pulse discharge. ASI values of this level are too high to meet HEV battery requirements.

Figure 10:
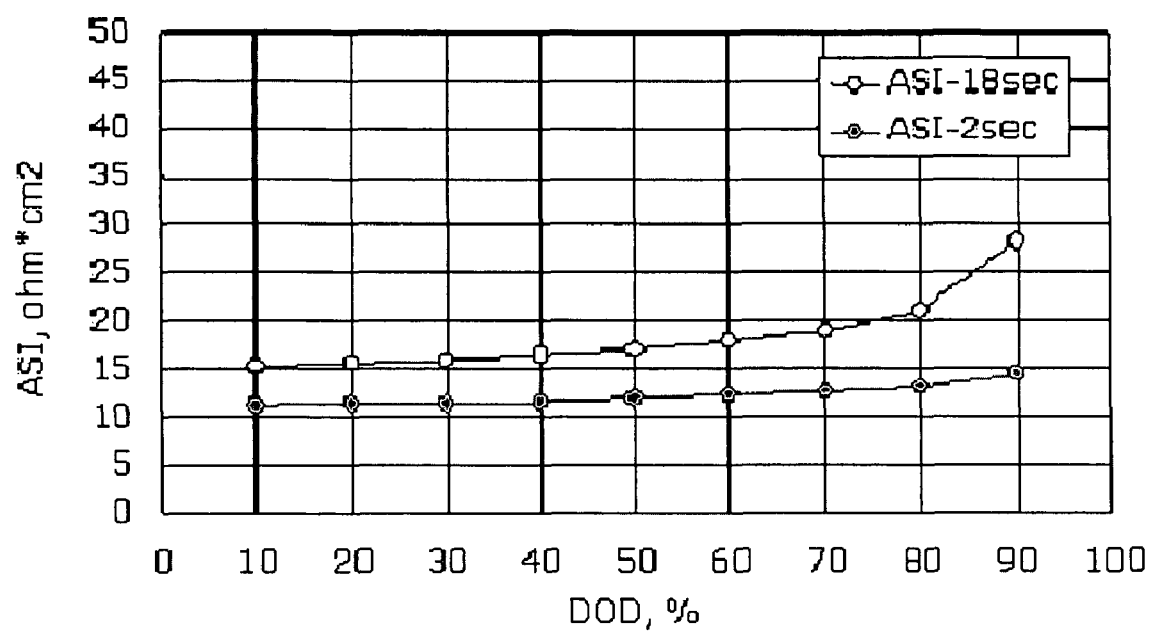
FIG. 10 is a graph of HPPC v. depth of the discharge of [$Li_4Ti_5O_{12}$/$Li_{1.06}Mn_2O_4$] cell, using 20 C pulse discharge. The $Li_4Ti_5O_{12}$ was prepared by the methods embodied herein.
Figure 11:
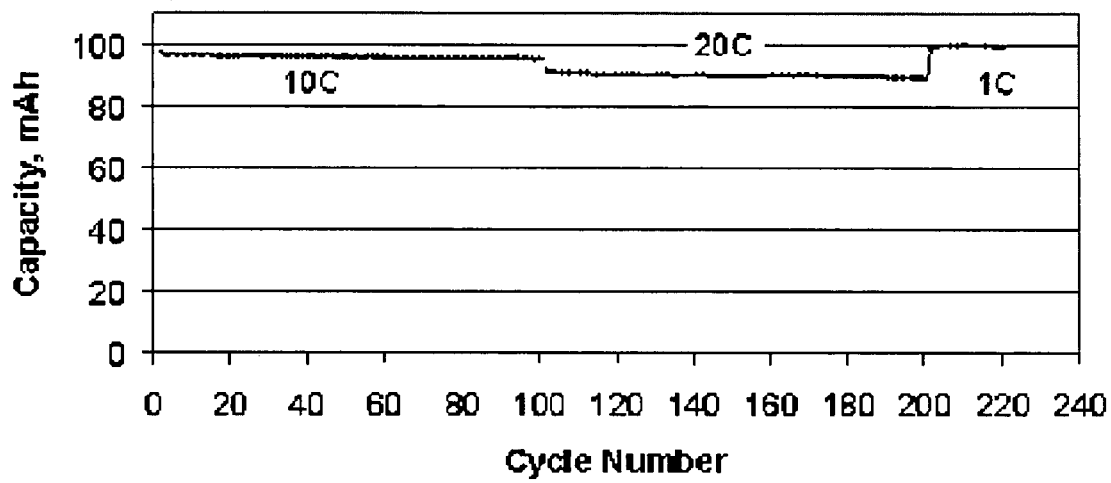
FIG. 11 is a graph of capacity v. cycle number for a [$Li_4Ti_5O_{12}$/$Li_{1.06}Mn_{1.94}O_4$] cell over the first two hundred cycles at 10 C and 20 C pulse discharge rates. The $Li_4Ti_5O_{12}$ was prepared by the methods embodied herein.

The HPPC test was also carried out on $Li_4Ti_5O_{12}$ prepared according to embodiments provided herein, both before and after carbon-coating. Cells based on this material before carbon-coating (FIG. 10) show outstanding power capability with 18 s pulse discharge, and ASI around 15 Ohm·$cm^2$ at pulse discharge rates of 20 C. The power capability of cells based on nano-structured $Li_4Ti_5O_{12}$ exceeds the FreedomCAR power requirement for application in HEVs. Furthermore, when cycling the material at 10 C and 20 C pulse discharge rates, the capacity of the material remains very stable, with almost no fade at a continuous charge and discharge cycling (see FIG. 11). In addition, the full cell capacity at a 20 C rate was close to that when cycling the cell at a 1 C rate.

Figure 12:
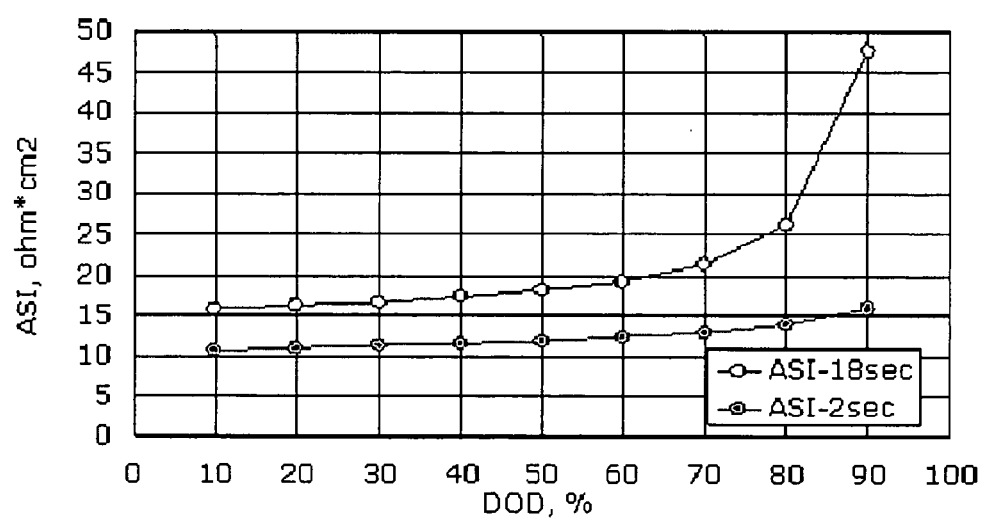
FIG. 12 is a graph of HPPC v. depth of the discharge of [C—$Li_4Ti_5O_{12}$/$Li_{1.06}Mn_{1.94}O_4$] cell, using a 40 C pulse discharge rate.

After coating the $Li_4Ti_5O_{12}$ with carbon, the cell was able to sustain higher pulse rates of 40 C, with an ASI of approximately 15 Ohm·cm (FIG. 12). This result shows that the power capability of cells based on carbon-coated $Li_4Ti_5O_{12}$ exceeds the power requirements for a battery to level the load on the main engine in HEVs. Such ample power in cells based on $Li_4Ti_5O_{12}$, or carbon-coated $Li_4Ti_5O_{12}$, allows for the design of smaller batteries that can meet the power requirement for HEVs. Small batteries provide advantages for HEVs including, but not limited to cost consideration in building the batteries, lower mass of the individual batteries, lower overall mass of the HEV, etc. Power capabilities of cells based on $Li_4Ti_5O_{12}$, or carbon-coated $Li_4Ti_5O_{12}$ exceed the performance of [graphite/$LiNi_{1/3}Co_{1/3}Mn_{1/3}O_2$] cells or [graphite/$LiNi_{0.8}Co_{10.15}Al_{0.05}O_2$] cells as are currently being investigated for HEV applications. Hence, [C—$Li_4Ti_5O_{12}$/$Li_{1.06}Mn_2O_4$] Li-ion cells may be more suitable in terms of cost, weight, and calendar life in high power cells for HEVs, than similar graphite-based cells.

Example 5

Figure 13:
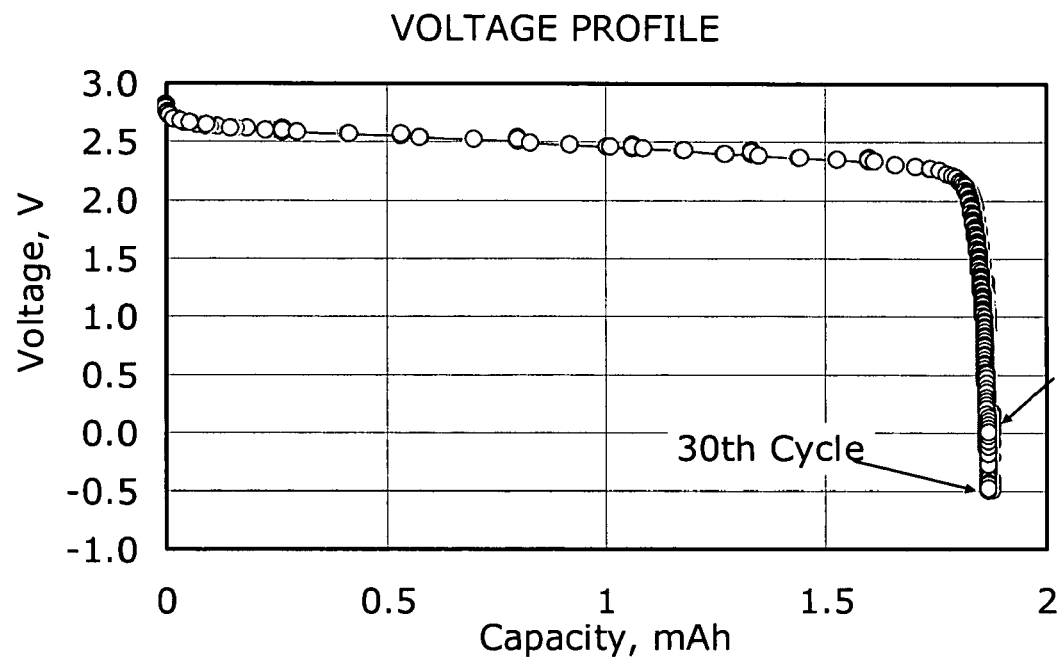
FIG. 13 is a plot of the voltage profile of a [$Li_4Ti_5O_{12}$/$Li_{1.06}Mn_{1.94}$] cell for the first and 30$^{th}$ cycles where aluminum is used as current collector for $Li_4Ti_5O_{12}$ electrode. The cell was cycled between 3.0 and −0.5V cycles.
Figure 14:
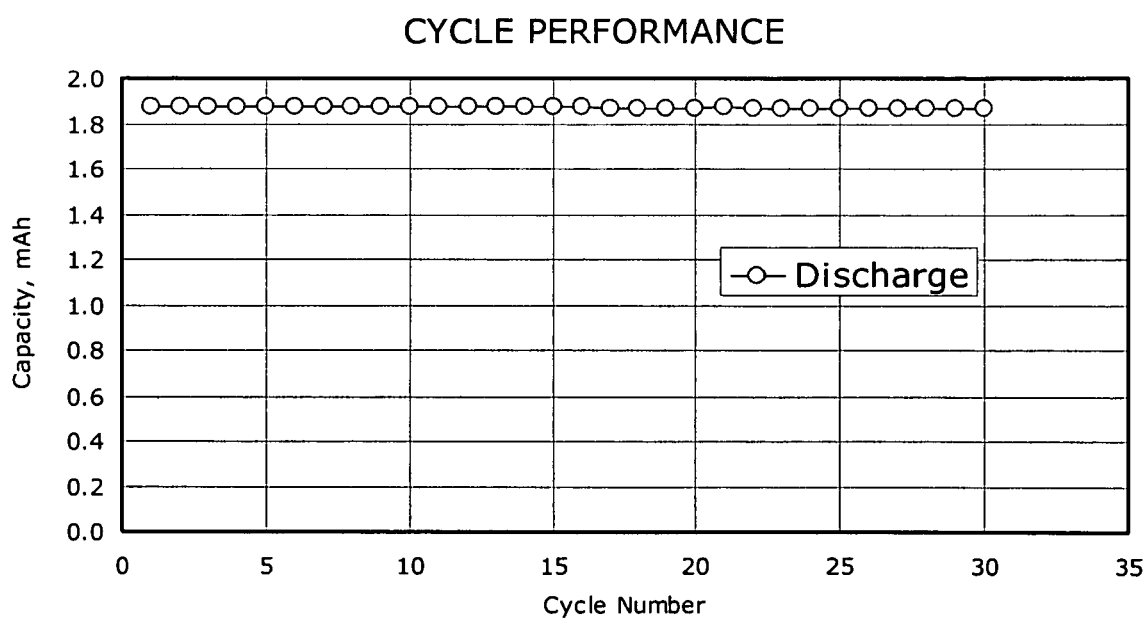
FIG. 14 is a plot of the capacity versus cycle number of a [$Li_4Ti_5O_{12}$/$Li_{1.06}Mn_{1.94}O_4$] cell where aluminum is used as a current collector for the $Li_4Ti_5O_{12}$ electrode. The cell was cycled 30 times between 3.0 V and −0.5 V.
Figure 15:
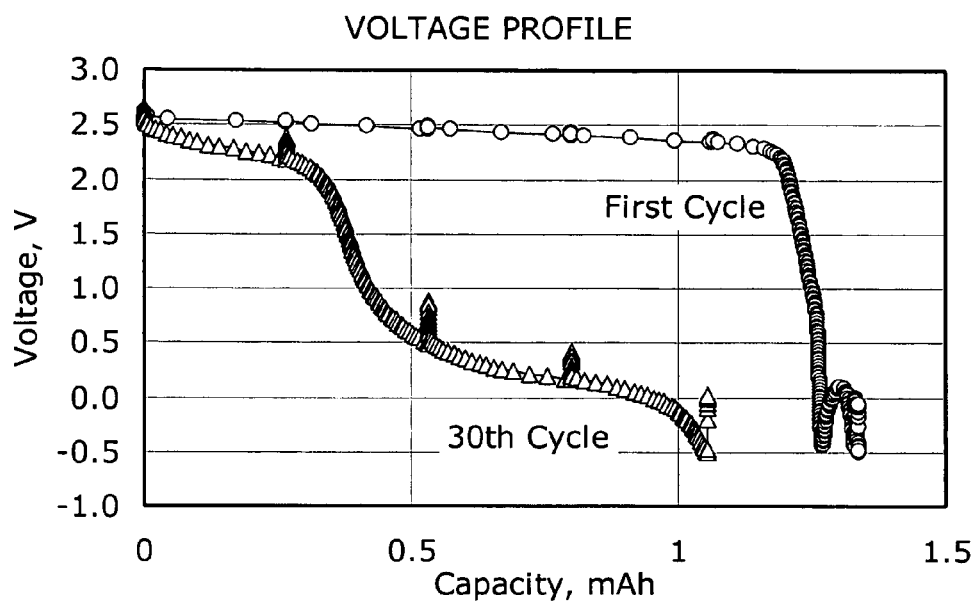
FIG. 15 is a plot of the voltage profile of a [$Li_4Ti_5O_{12}$/$Li_{1.06}Mn_{1.94}O_4$] cell for the first and 30$^{th}$ cycles where copper was used as the current collector for the $Li_4Ti_5O_{12}$ electrode. The Cell was cycled 70 times between 3.0V and −0.5V.
Figure 16:
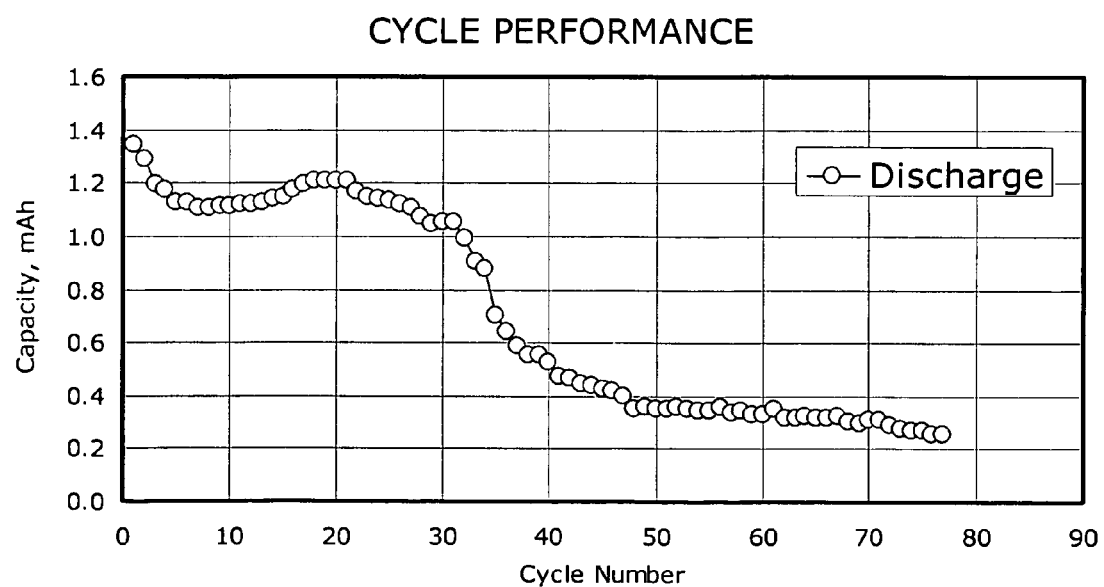
FIG. 16 is a graph of the capacity versus cycle number of a [$Li_4Ti_5O_{12}$/$Li_{1.06}Mn_{1.94}O_4$] cell using copper metal as the current collector. The cell was cycled over 70 times between 3.0V and −0.5V.
Figure 17:
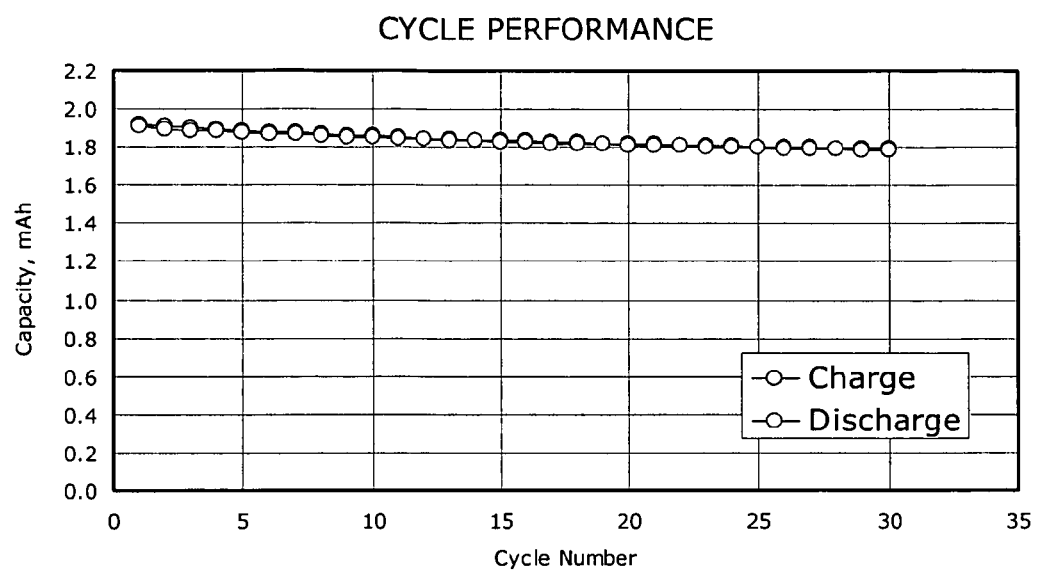
FIG. 17 is a graph of the capacity versus cycle number of a [$Li_4Ti_5O_{12}$/$Li_{1.06}Mn_{1.94}O_4$] cell where aluminum was used as the current collector for the $Li_4Ti_5O_{12}$ electrode. The cell was cycled 30 times between 3.0 V and 0 V at 55° C.
Figure 18:
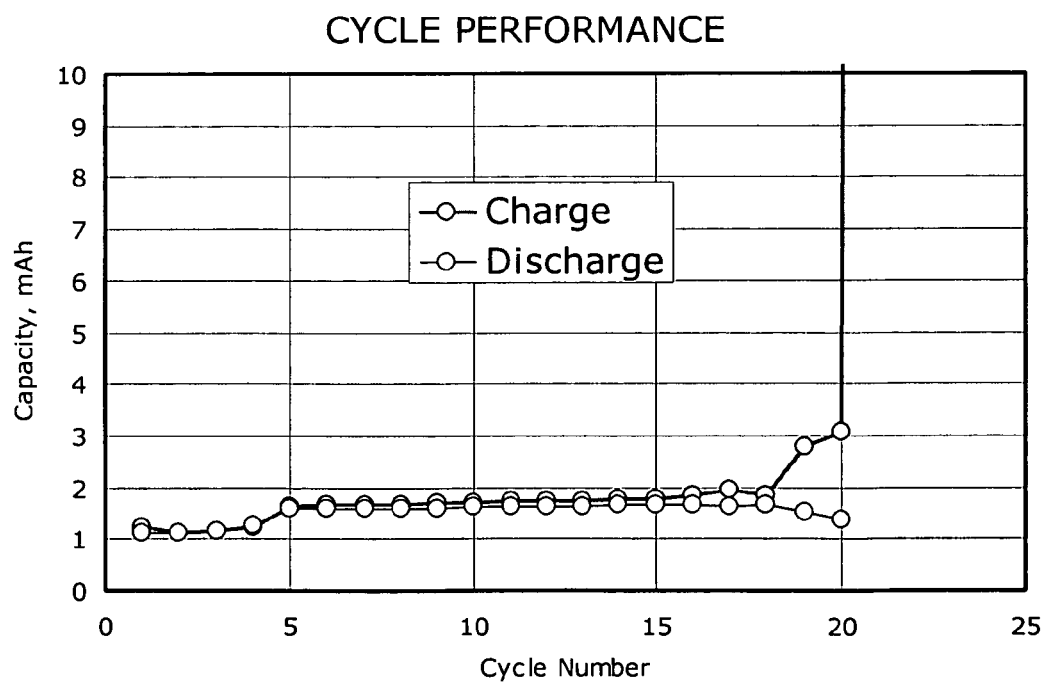
FIG. 18 is a graph of the capacity versus cycle number of a [$Li_4Ti_5O_{12}$/$Li_{1.06}Mn_{1.94}O_4$] cell where copper was used as the current collector for the $Li_4Ti_5O_{12}$ electrode. The cell was cycled 20 times between 3.0 V and 0 V at 55° C.

A 2.5 V Li-ion cell, [$Li_4Ti_5O_{12}$//1.2 M $LiPF_6$, EC/PC/DMC (1:1:3)//$Li_{1.06}Mn_{1.94}O_4$], was tested using the HPPC test, for HEV applications. The negative electrode consisted of $Li_4Ti_5O_{12}$ active material that was mixed with 10% acetylene black to enhance the conductivity of electrode, and 10% PVDF binder in NMP as a solvent to form a slurry. The slurry was then coated either onto Al-foil or Cu-foil. The positive electrode consisted of 80% $Li_{1.06}Mn_{1.94}O_4$ active material, 10% acetylene black, and 10% PVDF binder, coated onto an Al-current collector. The laminates were dried inside a vacuum oven to remove all solvent. The final electrodes were obtained after calendaring the laminates to about 35% porosity. To show the importance of the current collector in the [$Li_4Ti_5O_{12}$//1.2 M $LiPF_6$, EC/PC/DMC (1:1:3)//$Li_{1.06}Mn_{1.94}O_4$] cell chemistry, two otherwise identical $Li_4Ti_5O_{12}$-based negative electrodes were prepared: one on Al foil and the other on Cu foil. In this case, the positive electrode, prepared with $Li_{1.06}Mn_{1.94}O_4$ active material on an Al-foil. The [$Li_4Ti_5O_2$ with Al as current collector//1.2 M $LiPF_6$, EC/PC/DMC (1:1:3)//$Li_{1.06}Mn_{1.94}O_4$ with Al as current collector] and [$Li_4Ti_5O_{12}$ with Cu as current collector//1.2 M $LiPF_6$, EC/PC/DMC (1:1:3)//$Li_{1.06}Mn_{1.94}O_4$ with Al as current collector] cells were cycled between 3.0 V and −0.5 V at room temperature and at 55° C. FIGS. 13 and 14 show plots of the voltage profile and capacity vs. cycle number, respectively, of a [$Li_4Ti_5O_{12}$ with Al as current collector//1.2 M $LiPF_6$, EC/PC/DMC (1:1:3)//$Li_{1.06}Mn_{1.94}O_4$ with Al as current collector] cell cycled between 3.0 and −0.5V for 30 cycles. FIGS. 15 and 16 show plots of the voltage profile and capacity vs. cycle number, respectively, of a [$Li_4Ti_5O_{12}$ with Cu as current collector//1.2 M $LiPF_6$, EC/PC/DMC (1:1:3)//$Li_{1.06}Mn_{1.94}O_4$ with Al as current collector] cell cycled between 3.0V and −0.5V for over 70 cycles. As shown in FIGS. 13-16, the [$Li_4Ti_5O_{12}$ with Al as current collector//1.2 M $LiPF_6$, EC/PC/DMC (1:1:3)//$Li_{1.06}Mn_{1.94}O_4$ with Al as current collector] cell showed no capacity fade with cycling from 3.0V to −0.5V. However, the [$Li_4Ti_5O_{12}$ with Cu as current collector//1.2 M $LiPF_6$, EC/PC/DMC (1:1:3)//$Li_{1.06}Mn_{1.94}O_4$, with Al as current collector] cell using copper as a current collector for the negative electrode shows dramatic capacity fading within the same voltage window at room temperature. At 55° C., the [$Li_4Ti_5O_{12}$ with Al as current collector//1.2 M $LiPF_6$, EC/PC/DMC (1:1:3)//$Li_{1.06}Mn_{1.94}O_4$ with Al as current collector] cell exhibited limited capacity fading as shown in FIG. 17. Whereas, the capacity fade of the [$Li_4Ti_5O_{12}$ with Cu as current collector//1.2 M $LiPF_6$, EC/PC/DMC (1:1:3)//$Li_{1.06}Mn_{1.94}O_4$, with Al as current collector] was evident, as shown in FIG. 18.

Example 6

Figure 19:
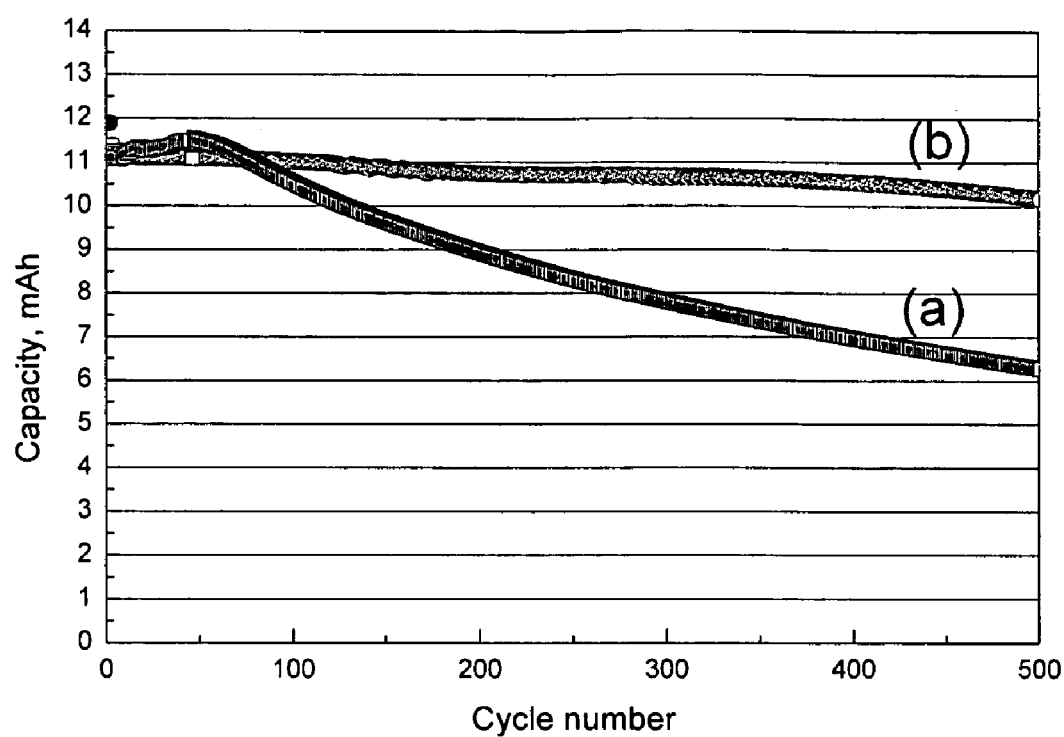
FIG. 19 is a graph of the capacity versus cycle number of (a) $LiMn_2O_4$/Graphite cell and (b) $LiMn_2O_4$/$Li_4Ti_5O_{12}$ cell. Both cells were cycled at 6 C rate at 55° C.

A 2.5 V cell [$Li_4Ti_5O_{12}$//1.2 M $LiPF_6$, EC/EMC (3:7)//$Li_{1.06}Mn_{1.94}O_4$] was fabricated with 15.5 cm² electrodes. The positive electrode consisted of 80 wt % $Li_{1.06}Mn_{1.94}O_4$, 10 wt % acetylene black, and 10 wt % PVDF. The negative electrode was made by coating a mix of the $Li_4Ti_5O_{12}$ material, 10 wt % acetylene black, and 10 wt % PVDF on a copper current collector. The same positive electrode was used to make a 4.0 V cell [Graphite//1.2 M $LiPF_6$, EC/EMC (3:7)//$Li_{1.06}Mn_{1.94}O_4$] where graphite was used as a negative electrode. In this case, the negative electrode consisted of a mix of graphite as mesocarbon microbeads (MCMB), and 10 wt % PVDF coated on a copper foil. Both cells were tested under similar conditions, i.e. current density and temperature. However, the $Li_4Ti_5O_{12}$ based cell was tested between 1.5 and 3 V while the graphite based cell was tested between 3 and 4.3 V. FIG. 19A shows the capacity vs. cycle number of the graphite/$LiMn_2O_4$ cell, and FIG. 19B shows the capacity vs. cycle number of the $Li_4Ti_5O_{12}$/$LiMn_2O_4$ cell. FIG. 20A and FIG. 19B show that under the same rate (96 C) and same temperature (55° C.), the $Li_4Ti_5O_{12}$/$LiMn_2O_4$ cell exhibits good cycling behavior with a limited capacity fade for up to 500 cycles, whereas the graphite/$LiMn_2O_4$ cell exhibits a substantial capacity fade.

While particular embodiments have been illustrated and described, it should be understood that changes and modifications can be made therein in accordance with ordinary skill in the art without departing from the invention in its broader aspects as defined in the following claims.

We claim:

1. A material comprising a lithium titanate comprising a plurality of primary particles and secondary particles, wherein
    the average primary particle size is about 5 nm to about 100 nm; and
    the average secondary particle size is less than 1 μm.

2. The material of claim 1, wherein the lithium titanate further comprises a carbon-coating.

3. The material of claim 2, wherein the carbon-coating is present at about 20 wt % or less based on the total weight of the material.

4. The material of claim 2, wherein the carbon-coating is present at about 5 wt % or less based on the total weight of the material.

5. The material of claim 2, wherein the carbon-coating is present at about 2 wt % or less based on the total weight of the material.

6. The material of claim 1, wherein the lithium titanate is $Li_4Ti_5O_{12}$.

7. A method of preparing the lithium titanate of claim 1 comprising:
    a) mixing a source of lithium ions and a source of titanium ions in a solvent;
    b) removing the solvent to form a solid mixture; and
    c) calcining the solid mixture.

8. The method of claim 7, wherein the solvent is selected from carboxylic acids, alcohols, esters, ethers, ketones, and a mixture of any two or more thereof.

9. The method of claim 7, wherein the source of lithium ions is selected from lithium oxide, lithium peroxide, lithium hydroxide, lithium carbonate, lithium nitrate, lithium oxalate, lithium acetate, lithium chloride, lithium fluoride, lithium iodide, and a mixture of any two or more thereof.

10. The method of claim 7, wherein the source of titanium ions is selected from anatase titanium oxide, rutile titanium oxide, a titanium-ion solution wherein the solution is aqueous, a titanium-ion solution wherein the solution is organic, a titanium-ion solution wherein the solution is a mixture of aqueous and organic solutions, and a mixture of any two or more thereof.

11. The method of claim 7, further comprising crushing the solid mixture prior to calcining the solid mixture.

12. The method of claim 7, wherein the calcining is at a temperature from about 600° C. to about 1000° C.

13. The method of claim 7 further comprising coating the particles of lithium titanate with a layer of carbon.

14. The method of claim 13, wherein the coating the particles of lithium titanate with a layer of carbon further comprises:
    exposing the lithium titanate to a carbon source in a furnace; and
    heating the carbon source to deposit carbon on the lithium titanate.

15. The method of claim 14, wherein the heating is from about 100° C. to about 1300° C.

16. The method of claim 14, wherein the carbon source comprises from 1 to about 20 carbon atoms, and is selected from acetylene, butane, 1,3 butadiene, 1-butene, cis-2-butene, trans-2-butene, 2,2-dimethylpropane, ethane, ethylene, hexane, heptane, isobutane, isobutylene, methane, 2-methylbutane, pentane, propane, propylene, octane, toluene, and a mixture of any two or more thereof.

17. The method of claim 14, wherein the carbon source is mixed with a carrier gas selected from carbon dioxide, nitrogen, helium, argon, or a mixture of any two or more thereof.

18. The method of claim 7, wherein the calcined mixture is $Li_4Ti_5O_{12}$.

19. A negative electrode comprising:
    the lithium titanate of claim 1;
    a current collector; and
    a binder;
    wherein the lithium titanate is coated onto the current collector.

20. An electrochemical device comprising:
the electrode of claim 19;
a positive electrode; and
a non-aqueous electrolyte.

21. An electrochemical device comprising the material of claim 1 coated on an current collector comprising aluminum.

* * * * *